United States Patent [19]

Jakubisin et al.

[11] Patent Number: 5,543,172
[45] Date of Patent: Aug. 6, 1996

[54] FALL ZONE COVERING FOR PLAYGROUND

[75] Inventors: John Jakubisin, Arlington; James K. Alfieri, Garland, both of Tex.

[73] Assignee: King Associates Inc., Delano, Minn.

[21] Appl. No.: 210,886

[22] Filed: Mar. 18, 1994

[51] Int. Cl.[6] .................................................. B05D 7/00
[52] U.S. Cl. ...................... 427/212; 427/424; 427/393.5; 428/403; 428/407; 428/504
[58] Field of Search ................... 428/504, 403, 428/407; 427/212, 222, 421, 424, 393.5

[56] References Cited

U.S. PATENT DOCUMENTS

| | | | |
|---|---|---|---|
| 3,736,847 | 6/1973 | Hickey | 272/56.5 |
| 3,801,421 | 4/1974 | Allen | 161/67 |
| 3,962,168 | 6/1976 | Edwards | 524/501 |
| 4,043,962 | 8/1977 | Adler et al. | 260/29.3 |
| 4,112,176 | 9/1978 | Bailey | 428/304 |
| 4,265,939 | 5/1981 | Tebbens et al. | 427/222 |
| 4,389,435 | 6/1983 | Haas, Jr. | 428/17 |
| 4,481,335 | 11/1984 | Stark, Jr. | 525/263 |
| 4,492,728 | 1/1985 | Zurkinden | 428/240 |
| 4,497,853 | 2/1985 | Tomarin | 428/17 |
| 4,529,622 | 7/1985 | Maxfield | 427/136 |
| 4,564,310 | 1/1986 | Thelan et al. | 428/331 |
| 4,622,193 | 11/1986 | Kresge et al. | 428/407 |
| 4,880,870 | 11/1989 | Zimmermann et al. | 428/407 |
| 4,948,116 | 8/1990 | Vaux | 272/3 |
| 4,968,024 | 11/1990 | Hawkins | 428/407 |
| 5,014,462 | 5/1991 | Malmgren et al. | 47/1.01 |
| 5,041,320 | 8/1991 | Meredith et al. | 428/87 |
| 5,105,577 | 4/1992 | Hedges | 47/9 |
| 5,157,082 | 10/1992 | Johnson | 525/232 |
| 5,182,137 | 1/1993 | Allen | 428/327 |

*Primary Examiner*—Mark D. Sweet
*Attorney, Agent, or Firm*—Dennis T. Griggs

[57] ABSTRACT

Rubber slivers which are encapsulated within a protective, decorative film of weather-resistant and color-fast resin are used as unconsolidated fall zone material around and under playground equipment. The resin is applied to rubber slivers in the form of an aqueous coating in which a modified acrylic copolymer is mixed with color pigment and rheological additives. The aqueous coating is sprayed onto the rubber slivers as they fall by gravity flow through a drop zone. Thereafter, the aqueous coating is dried and set as the coated rubber particles are conveyed through the exposure zone of a hot air dryer.

1 Claim, 2 Drawing Sheets

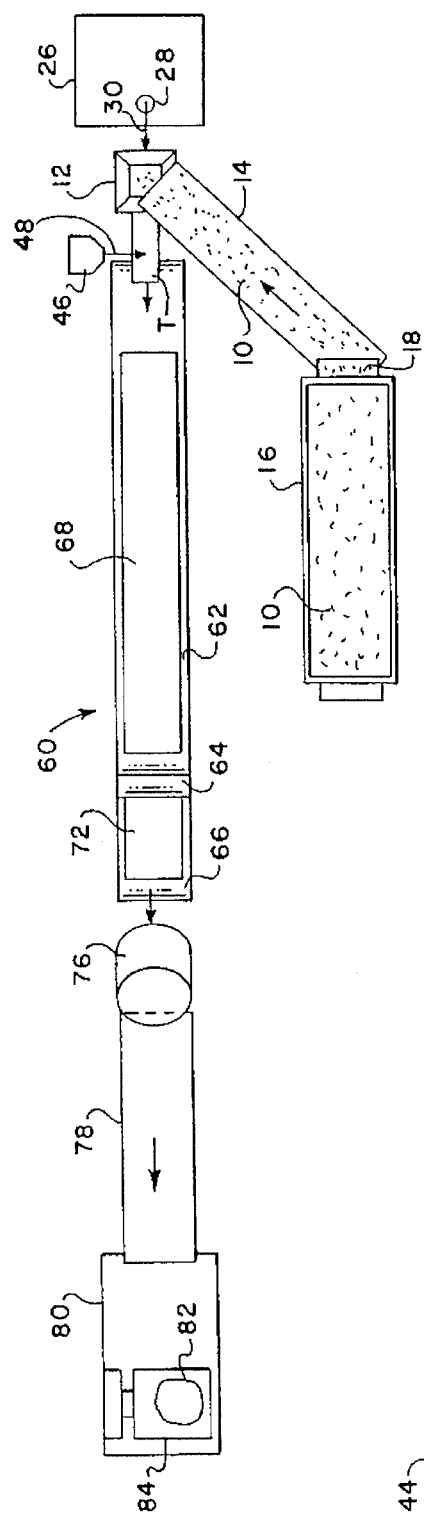
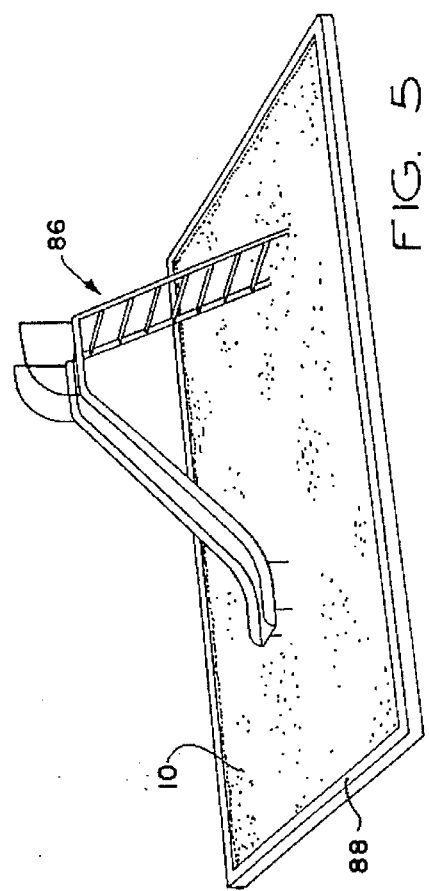
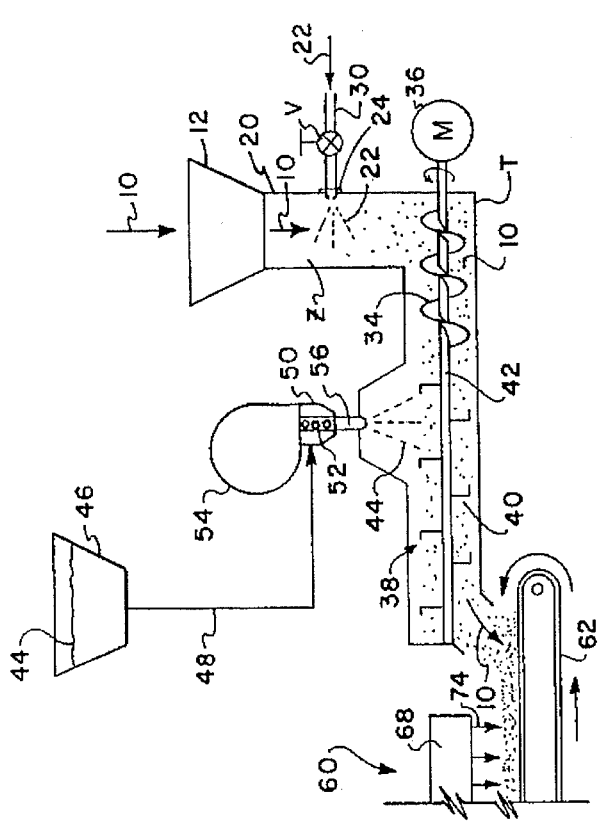
FIG. 3
FIG. 5
FIG. 4

FALL ZONE COVERING FOR PLAYGROUND

FIELD OF THE INVENTION

This invention relates generally to synthetic ground coverings, and in particular to unconsolidated, loose-fill coverings made of rubber fragments which may be used as protective ground coverings for playground fall zones.

BACKGROUND OF THE INVENTION

Dedicated playground areas are maintained by schools, daycare centers, city parks and fast food restaurants for use by children. The playground areas may include slides, swings, carousels, climbing bars and the like which children use for climbing, jumping, riding and swinging. Such activities often result in falls which may cause injury.

DESCRIPTION OF THE PRIOR ART

Unconsolidated, loose-fill materials such as sand, sawdust and wood chips are in widespread use as fall zone covering materials. Such materials have been placed over the fall zones under and around playground equipment, typically to a depth of from about four inches to about twelve inches. Such unconsolidated covering materials have good shock absorbing properties and are well-suited for outdoor playground use. However, a few injuries still occur, particularly as a result of falls from heights above about four feet. Consequently, there is a continuing interest in providing fall zone covering materials which have improved shock absorbing capability for preventing fall-related injuries on playgrounds.

SUMMARY OF THE INVENTION

According to one aspect of the present invention, an unconsolidated, loose-fill fall zone material utilizes rubber fragments or slivers which are encapsulated within a protective, decorative film of weather-resistant and colorfast resin which is bonded to the surface of the rubber slivers. The resin coating increases the effective bulk of the slivers, improves resiliency, resists compaction and resists decomposition caused by playground activities and outdoor environmental effects such as solar radiation, thermal cycling, moisture and exposure to chemical agents.

According to another aspect of the present invention, the resin is applied to fragments or rubber slivers in the form of an aqueous coating mixture in which the essential film-forming ingredients consist essentially of from about forty-eight to about fifty percent by weight of a modified acrylic copolymer resin mixed with from about forty-five to about forty-seven percent by weight of color pigment and from about three to about seven percent by weight rheological additives.

According to another aspect of the present invention, the rubber slivers are coated by spraying the aqueous coating onto the rubber slivers as they free-fall through a drop zone. Thereafter, the coated rubber slivers are conveyed through the exposure zone of a hot air dryer, with the aqueous component being evaporated by exposure to forced hot air flow as the coating film dries and adheres to the rubber slivers.

Other features and advantages of the present invention will be appreciated by those skilled in the art upon reading the detailed description which follows with reference to the attached drawings.

BRIEF DESCRIPTION OF THE DRAWINGS

FIG. 3 is a top plan view thereof;

FIG. 4 is a simplified schematic diagram showing spray treatment of the raw rubber slivers; and, FIG. 5 is a perspective view showing a typical application of the covering material, in which it is placed over the fall zone surrounding a playground slide.

DETAILED DESCRIPTION OF THE PREFERRED EMBODIMENT

Figure 1:
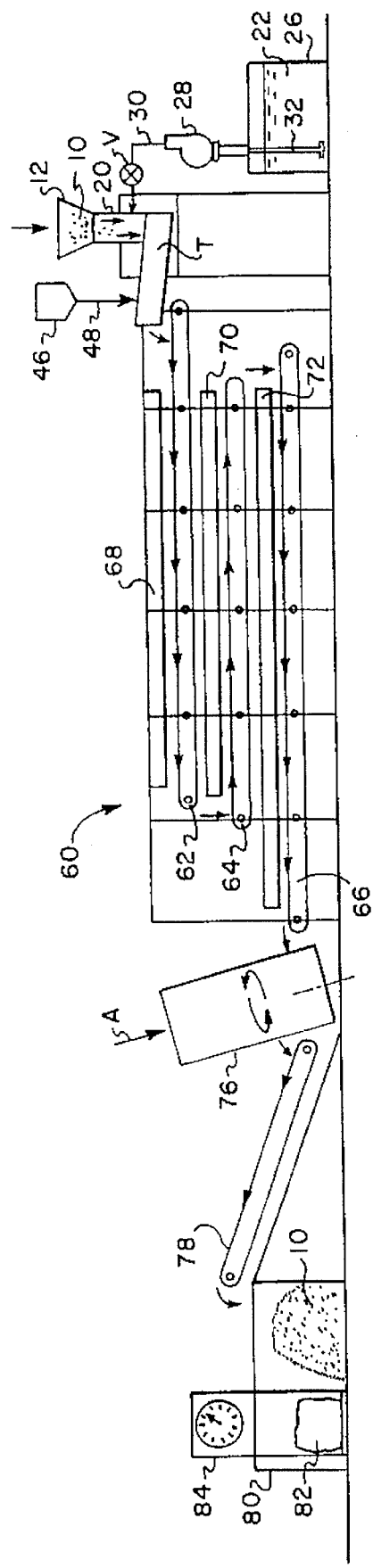
FIG. 1 is a simplified elevational view of processing apparatus for producing coated rubber slivers according to the present invention.

In the description which follows, like parts are indicated throughout the specification and drawings with the same reference numerals, respectively. The figures are not drawn to scale and the proportions of certain parts have been exaggerated for convenience of illustration.

"Rubber fragments", "rubber particles" and "rubber slivers" are used interchangeably herein and include natural and synthetic rubber materials. Suitable synthetic rubber materials include, for example, polyisoprene, polychloroprene, polyacrylonitrile, polybutadiene, ethylene-propylene copolymers, butadiene/styrene copolymers, acrylonitrile/butadiene copolymers, acrylonitrile/methyl methacryate copolymers, and ethylene/vinyl acetate copolymers. Recycled rubber scrap, for example, fragments produced by shredding, milling, buffing and comminution of used rubber tires may be used to good advantage.

Preferably, the rubber fragments are elongated slivers of vulcanized rubber, typically from about ¾ to 1 ½ inch in length and from about fifty to about two hundred mils thick.

The rubber fragments are encapsulated within a protective, decorative film of weather-resistant and color-fast resin. The coated rubber fragments are heated to promote tacky merging of the rubber and the coating, thereby providing a molecular bond. The protective coating consists essentially of an aqueous mixture of a modified acrylic copolymer resin mixed with color pigment and rheological additives. The modified acrylic copolymer resin includes those modified with methacrylate monomers; those modified with vinyl monomers such as vinyl acetate, vinyl versatate and vinyl chloride; and those modified with styrene monomers such as vinylbenzene, phenylethylene and cinnamene.

The color pigment solution predominantly contains water as a solvent and/or dispersing agent. The coloring component may be organic and inorganic colored pigments derived from water doughs, and dye stuffs which are soluble in water. In addition to water, the coloring solution contains a minor amount of organic solvents which are completely or partially miscible with water.

The rheological additives include those additives such as modified cellulose thickeners, modified acrylic thickeners and the hydrophobically modified urethane thickeners, and non-ionic and anionic surfactants.

The essential film forming ingredients of the coating composition consists essentially of about forty to about fifty percent by weight—modified acrylic resin; about forty-five to about forty-seven percent by weight—pigment; and about three to about seven percent by weight—rheological additives.

The essential components of the coating composition are mixed with water and blended together by stirring in a conventional mixing vat. The volume of water in the mixture is selected to provide a viscosity of the aqueous coating mixture in the range of from about 85 K.U. to about 115 K.U. (Krebs Units—measured at 70° F. by a Krebs-Stormer viscometer).

The viscosity of the aqueous coating mixture should be high enough to permit it to be sprayed onto the rubber slivers as will be described in connection with the processing apparatus shown in FIG. 1, FIG. 2, FIG. 3 and FIG. 4. The rubber fragments are easily wettable by the coating composition, which spreads uniformly and forms an encapsulating film layer around each sliver. Because the coating composition has an aqueous base, it will dry relatively quickly in response to heat and evaporation. The dried coating is resilient, durable against environmental conditions, and resists compaction during use. The coating composition is bonded by tacky merger with the heated rubber fragments during hot air drying, thereby inhibiting cracking and peeling.

Figure 2:
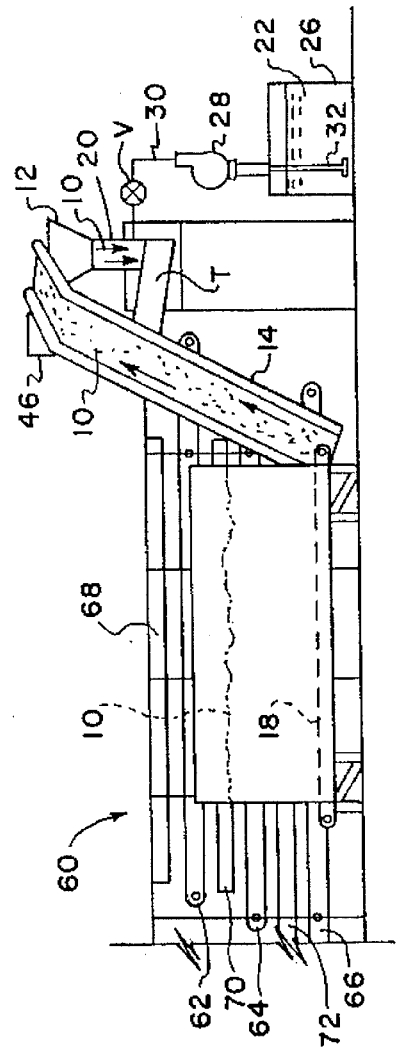
FIG. 2 is a view similar to FIG. 1, showing transfer of raw rubber slivers from a holding bin to the input hopper.

Referring now to FIGS. 1 and 2, rubber fragments 10 are delivered to an inlet hopper 12 by an inclined input belt conveyor 14. The rubber fragments 10 are withdrawn from a storage bin 16 and are transferred to the inlet hopper 12 on the input belt conveyor 14. The rubber fragments which are to be coated are withdrawn from the storage bin 16 by a variable speed input belt conveyor 18.

Referring now to FIG. 2 and FIG. 4, the rubber fragments 10 fall by gravity flow from the hopper 12 through a drop zone Z within a vertical spray enclosure 20. Liquid coating material 22 is sprayed transversely across the path of the falling rubber fragments, thus wetting each fragment with the liquid coating composition as it falls through the drop zone Z.

The liquid coating composition 22 is pumped from a supply reservoir 26 by a pump 28. The liquid coating material 22 is conducted to the spray nozzle 24 through a delivery conduit 30. As the rubber fragments 10 fall through the spray enclosure 20, the coating material 22 is drawn through a suction conduit 32 which is submerged within the reservoir 26. The liquid coating material is then sprayed onto the rubber fragments as they fall through the drop zone Z. The liquid coating material 22 disperses uniformly over the external surface of each rubber fragment, thereby totally encapsulating each piece.

The volume of liquid coating material 22 which is discharged into the spray enclosure 20 is monitored and controlled by an adjustable valve V, which is coordinated with the mass flow rate of the rubber fragments. The preferred ratio is about ½ gallon per minute of coating material to 1.5 cubic feet (approximately twenty-five pounds) of rubber per minute. This will produce thirty bags (1,500 pounds of coated rubber fragments per hour).

After receiving a film of the liquid coating material 22, the coated rubber fragments 10 fall into a transfer conduit T. The coated fragments 10 are immediately transferred through the transfer conduit by a screw conveyor 34. The screw conveyor 34 is coupled to a variable speed drive motor 36, whose speed is coordinated with the mass flow rate of the rubber fragments 10 so that accumulation of the coated rubber fragments is avoided.

The coated rubber fragments 10 are maintained in a state of continuous tumbling motion by a slinger assembly 38. The slinger assembly 38 includes multiple slinger arms 40 which are secured to a rotor shaft 42. The slinger arms 40 are longitudinally and angularly spaced uniformly with respect to each other so that the coated rubber particles are tumbled uniformly as they are conveyed through the transfer conduit T.

According to one aspect of the invention, a fire retardant material 44 is sprayed onto the freshly coated rubber fragments 10 as they are conveyed through the transfer conduit 32 (FIG. 4). Preferably, the fire retardant material 44 is in the form of a sprayable powder, for example sodium bicarbonate ($NaHCO_3$). The sodium bicarbonate powder 44 is drawn from a supply container 46 through a delivery conduit 48 into the inlet port of a venturi mixing chamber 50. The venturi mixing chamber 50 has a central air flow tube 52 which conducts pressurized air produced by a pump 54. As the pressurized air flows through the central venturi flow passage, sodium bicarbonate powder 44 is drawn into the venturi tube 52 and becomes entrained in the air flow. The entrained sodium bicarbonate powder 44 is then discharged onto the coated rubber slivers 10 through a spray nozzle 56.

The spray powder station is shown in FIG. 4 as situated between the coating application station and the uppermost belt conveyor 62. The spray powder 44 may be applied at other locations, for example at one of the dryer stations. It may be desirable for some applications to apply the spray powder 44 after a bond has been achieved between the coating material and the rubber slivers, and after some drying has taken place, but while the coated rubber fragments are still tacky.

Because the freshly coated rubber fragments 10 are tacky at the time they are conveyed through the spray powder station, the sodium bicarbonate powder 44 adheres to the coated slivers as they move through the transfer chamber 32. That is, particles of sodium bicarbonate powder 44 adhere to the tacky film coating 22 on each rubber sliver 10, thus forming a jacket of fire retardant material surrounding each rubber fragment.

The coated rubber fragments 10 are then discharged onto a multiple tier belt conveyor assembly 60. The belt conveyor assembly 60 includes a triple stack of belt conveyors 62, 64 and 66 which transport the encapsulated rubber fragments 10 from right to left on the uppermost tier 62, from left to right on the intermediate level tier 64, and then from right to left on the lowermost tier 66. At each level, the coated rubber fragments 10 are transported through the exposure zone of hot air dryers 68, 70 and 72, respectively.

Referring to FIG. 4, the freshly coated and powdered fragments 10 are dumped from the transfer conveyor 32 onto the uppermost conveyor 62. The aqueous component of the coating 22 is evaporated as the fragments pass through the exposure zone of the hot air heaters. Hot air, represented by the arrows 74, is directed onto the coated fragments 10 along substantially the entire length of each conveyor. As a result, the treated fragments are heated to a temperature of about 200°, which promotes tacky intermingling between the coating material 22 and the rubber fragments 10.

As the coated rubber fragments 10 are conveyed from tier to tier and by changing the flow direction as indicated, the coated rubber fragments 10 are turned over twice, promoting rapid drying action. The conveyors and dryers are shrouded between tiers to contain the heat during the drying process.

The lowermost conveyor 66 transfers the treated rubber fragments to a cooling tumbler 76. Ambient air, represented by the arrow A, is circulated through the tumbler 76 for the purpose of reducing the temperature of the treated rubber fragments. A temperature reduction is desirable to prevent the treated rubber fragments from adhering to each other during bagging and storage.

The cooled rubber fragments are then deposited onto an output belt conveyor 78, which transfers the dried material to a weighing and bagging station 80. The dried rubber fragments 10 are then loaded into plastic bags 82 which are weighed by a scale 84 and sealed for transport to a storage warehouse.

Referring now to FIG. 5, the fall zone surrounding a playground slide 86 is covered by the coated rubber fragments 10. Scattering of the coated rubber fragments out of the fall zone is prevented by a rectangular retainer frame 88. The material depth in the fall zone is determined by the platform fall height of the playground slide 86.

The following TABLE I shows ASTM test results for covering material depth versus maximum fall height for the coated rubber fragments 10:

TABLE I

| RUBBER FRAGMENT DEPTH | MAXIMUM FALL HEIGHT | ASTM PEAK G-FORCE | ASTM HIC VALUE |
| --- | --- | --- | --- |
| 2 In. | 3 Feet | 128 | 425 |
| 3 In. | 5 Feet | 152 | 715 |
| 4 In. | 7 Feet | 164 | 728 |
| 5 In. | 8 Feet | 179 | 625 |
| 6 In. | 12 Feet | 186 | 820 |
| 7 In. | 13 Feet | 176 | 755 |

The test data given above indicate that the fall zone material 10 is in compliance with ASTM standards F1292-93 and F355 relative to impact attenuation of surface systems under and around playground equipment as referenced in ASTM specification F1487 published November, 1993.

EXAMPLES

The following examples are illustrative of the practice of the invention:

EXAMPLE 1

A grind base (color pigment and rheological additives excluding resin) consisting of tap water (83 parts by weight), titanium dioxide (20 parts by weight), calcium carbonate and silica pigments (75 parts by weight), and rheology additives (28 parts by weight) were combined and mixed for seventeen minutes in a high speed displacing mixer until a smooth and homogeneous mixture was achieved. The grind base mixture was then added to a vinyl acrylate latex (282 parts by weight), and mixed slowly until a viscosity of approximately 100 K.U. (Krebs Units—measured at 70° F. by a Krebs-Stormer viscometer) was achieved. Universal tint colors were added until the desired color was achieved. Aqueous ammonium hydroxide solution was added to adjust the pH of the mixture to above 8.0. The resulting mixture was then diluted with two parts tap water and applied to rubber fragments which were sized at about one inch length and about 125 mils thick. The coated fragments were baked at about 200° F. for twenty minutes. The results were only a slight coloring of the fragments with inconsistent film thickness and poor adhesion to the rubber.

EXAMPLE 2

A grind base composition was prepared in accordance with the method described in Example 1 except predispersed color pigments (77 parts by weight) were added to the grind base. The coated fragments were diluted and baked as set forth in Example 1. The results were an improved uniform coloring of the rubber fragments with consistent film thickness, but adhesion to the rubber was poor.

EXAMPLE 3

A grind base was prepared in accordance with the method described in Example 2 except that the tap water used for dilution was thickened to approximately 100 K.U. (Krebs Units) with hydroxy ethyl cellulose base before adding to the mixture. The results were a uniform coloring of the rubber fragments with consistent film thickness, but adhesion to the fragments was poor.

EXAMPLE 4

A grind base composition was prepared in accordance with the method described in Example 3 except that the mixture as added to a blend of vinyl acrylate latex (93 parts by weight) and acrylate latex (189 parts by weight). The result was a uniform coloring of the particles with consistent film thickness, and good adhesion to the rubber fragments.

What is claimed is:

1. A method for producing unconsolidated fall zone covering material comprising the steps:

permitting rubber fragments to fall by gravity flow through a drop zone;

coating the rubber fragments with a liquid coating material which forms a resilient film upon drying by spraying the liquid coating composition onto the fragments as they fall through the drop zone;

heating the coated rubber fragments to a temperature sufficient to cause the rubber fragments to become tacky; and, intermingling the resinous component of the coating material with the tacky rubber fragments.

* * * * *